P. H. THIEL.
HARROW LIFTING AND CLEARING DEVICE.
APPLICATION FILED MAY 23, 1921.

1,399,718. Patented Dec. 6, 1921.

Witness
Fred Latta

Inventor
Peter H. Thiel
By Bair & Freeman
Attorneys

UNITED STATES PATENT OFFICE.

PETER H. THIEL, OF RENWICK, IOWA.

HARROW LIFTING AND CLEARING DEVICE.

1,399,718.  Specification of Letters Patent.  Patented Dec. 6, 1921.

Application filed May 23, 1921. Serial No. 471,871.

*To all whom it may concern:*

Be it known that I, PETER H. THIEL, a citizen of the United States, and a resident of Renwick, in the county of Humboldt and State of Iowa, have invented a certain new and useful Harrow Lifting and Clearing Device, of which the following is a specification.

The object of my invention is to provide a harrow lifting and clearing device of simple, durable and inexpensive construction.

More particularly, it is my object to provide a harrow lifting and clearing device adapted to be connected with a harrow section and to be actuated from a harrow cart or the like for lifting the rear end or portion of the harrow section for permitting debris and the like, which may have collected under the harrow to be freed from the harrow teeth.

Figure 1:
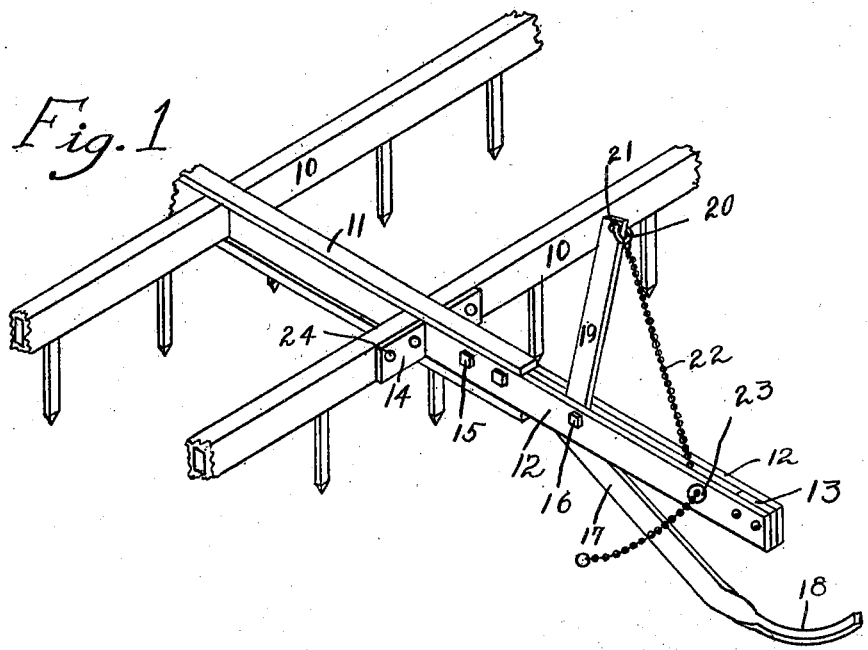
Figure 2:
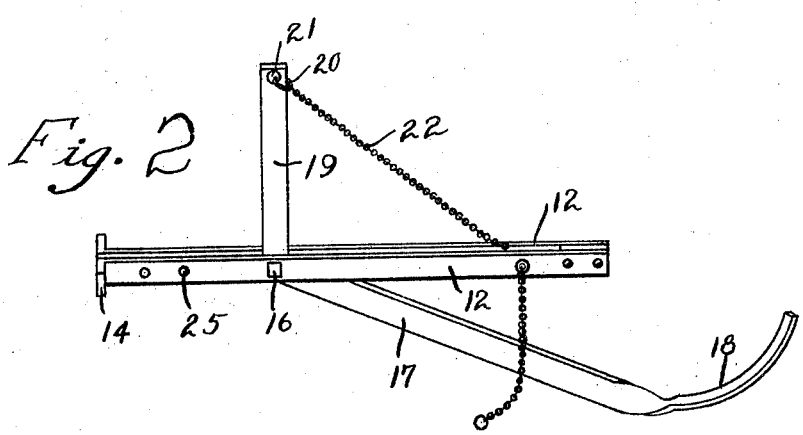

With these and other objects in view, my invention consists in the construction, arrangement and combination of the various parts of my invention, whereby the objects contemplated are attained, as hereinafter more fully set forth, pointed out in my claims, and illustrated in the accompanying drawings, in which:

Figure 1 shows a perspective view of a part of a harrow section equipped with a raising and clearing device embodying my invention; and Fig. 2 shows a perspective view of the raising and clearing device.

It is well-known that in the use of the ordinary drag or harrow, the teeth become clogged with corn stalks, weeds, grass and other debris. If the user is walking behind the harrow, he can step forward and lift the rear portion of the harrow until the harrow clears the debris.

It is well-known, however, that the harrow cart, hitched to the harrow and upon which the driver may ride, is coming into more and more common use. Where the cart is employed and one of the harrow sections becomes clogged, the driver must stop the team, get down from the cart, walk to the section which has become clogged, lift the rear portion thereof, drive the team forward a few steps, drop the harrow section, stop the team and walk back to the cart. This, of course, makes the clearing of the debris from beneath the harrow a nuisance where such a cart is used.

It will be obvious that where the harrow is tractor drawn, the inconvenience arising from the necessity of clearing the harrow section, which may have become clogged is even greater, because where the tractor is used, one man can not drive the tractor ahead and hold up the rear end of one harrow section, but the driver must lift up the harrow section and pull out the debris.

It is therefore my purpose to provide a simple and inexpensive device, whereby the rear end of the harrow may be raised and held in raised position, while the harrow is being pulled forward, for allowing the harrow to clear the debris, which may have clogged it.

The device, which I have provided for this purpose, may be operated from the driver's seat of the cart or from the driver's position on the tractor and this operation can be performed without stopping the team or the tractor, as the case may be.

In the drawings herewith whereby my invention is illustrated, I have shown a portion of one section of a harrow. In this connection, it may be mentioned that ordinarily the drag consists of several sections, and each of the sections sometimes becomes clogged in the manner hereinbefore mentioned.

I have shown a section, having the cross bars 10, and have shown the central longitudinally arranged bar 11, which in the form of the device herein illustrated, extends rearwardly a short distance from the rear cross bar.

It is, of course, well known that the cross bars and longitudinal bar are of different construction in different harrows.

In the particular harrow section shown herein for illustrating the construction and use of my device, I have shown the bar 11 in the form of an I-beam.

My improved raising and clearing device preferably comprises a pair of parallel bars 12 slightly spaced from each other and having between their rear ends a separator plate 13. The bars 12 are connected at their forward ends to the harrow rigidly and extend rearwardly from the harrow. These bars may be secured to the harrow in various ways. In the particular form of the invention herein illustrated, the bars 12 receive between them at their forward ends, the central portion of the I-beam frame member 11, as clearly illustrated in Fig. 1.

At the forward ends of the bars 12 are opposite lateral extensions 14. Where the longitudinal bar 11 or its equivalent does not extend rearwardly from the rear cross bar 10, the extensions 14 are bolted or riveted to the rear cross bar. Where the longitudinal bar 11 does extend rearwardly from the rear harrow cross bar, the forward ends of the bars 12 are secured to the rearwardly extending portion of the bar 11 by means of bolts 15 or the like.

Pivoted by means of a bolt 16 or in any suitable way between the bars 12 near the forward portions thereof is a bar 17, which extends rearwardly and downwardly and at its rear end has a shoe 18 adapted to travel on the ground. The shoe 18 in the form of the device herein shown is made by simply twisting the bar 17 until the shoe portion 18 of the said bar may slide flat on the ground. Extending upwardly from the forward end of the bar 17 is an arm or member 19. Suitably connected with the upper end of the arm 19, as by means of a ring 20 extended through a hole 21, is a flexible element, such for instance as a chain 22, preferably made with small smooth welded links. Any suitable flexible device adapted for the purpose could be employed.

The chain or flexible device 22 is extended downwardly and rearwardly from the upper end of the arm 19 around or through a suitable guide at the rear portion of the bars 12. As here shown, one of the bars 12 is provided near its rear end with a hole 23. The material around the hole 23 is smoothed or rounded off to allow the chain to slide freely through the hole.

It will be understood that the chain may be of such proper length or may be connected with a strap, rope or other means, which extends either to position readily accessible from the seat of the harrow cart or from the driver's position on a tractor.

In the practical use of my improved lifting and clearing device, when the harrow is being drawn forwardly, the bars 12 project rigidly rearwardly from the harrow. The weight of the bar 17 and shoe 18 is sufficient to draw them downwardly, so that ordinarily the shoe 18 slides over the ground.

I provide a lifting and clearing device for as many of the sections of the harrow as may be desired.

If one of the sections becomes clogged and it is desired to clear the section from the debris under it, the operator grasps the chain 22 or the flexible member, which may be connected with it and pulls thereon.

It will be seen that this pulling of the chain will force the upper end of the arm 19 rearwardly toward the rear ends of the bars 12, whereby the shoe 18 is forced against the ground as a fulcrum, and the entire rear portion of the harrow section and the bars 12 are raised upwardly. The load is imposed upon the bar 17 and arm 19, which comprises the lever at the pivot point 16.

It will be seen that the load will then be supported on the shoe 18 and the forward portion of the harrow, and that the rear portion of the harrow will be tilted upwardly. Thereafter as the harrow is drawn forwardly by the team or the tractor, the debris will be left, and the operator can release the draft on the chain 22, whereupon the rear part of the harrow section will drop to the ground and the dragging operation may be continued.

It will be understood that the extensions 14 are provided with suitable bolt holes 24 and that the bars 12 are provided with bolt holes 25 to receive the bolts, whereby the device is attached to the harrow section.

The saving of time and inconvenience, which is accomplished by a device of this kind is manifest from the foregoing description of the purposes and operation of the device.

My raising and clearing device is of such simple structure that it can be made and sold at a very reasonable price.

The device can be readily and easily attached to practically all makes of harrows at a minimum expense.

It may be mentioned that where the cross bars of the harrow are rotatable, so as to tilt the teeth to different angles and the bars 12 are secured to the bar 11, the lifting and clearing device is fastened to the bar 11 far enough rearwardly from the rear cross bar, so as not in any way to interfere with the tilting of the latter to adjust the angle of the teeth.

Where the bar 11 does not extend rearwardly from the rear cross bar and the extensions 14 are secured to the rear cross bar, my device does not interfere with the adjustment of the cross bars to regulate the angle at which the teeth stand, on account of the fact that the bar 17 carrying the shoe 18 is pivoted to the bars 12, so that even where the cross bar of the harrow is tilted to different positions, the shoe 18 simply drops to position where it travels on the ground, and then my device may be operated in all of the positions of the harrow cross bars.

Some changes may be made in the details of structure and arrangement of the parts of my device without departing from the real spirit and purpose of my invention, and it is my intention to cover by my claims, any modified forms of structure or use of mechanical equivalents, which may be reasonably included within their scope.

I claim as my invention:

1. The combination of a harrow section with a lifting and clearing device, comprising a member fixed to said section at the rear portion thereof, a member pivoted to said first member and adapted to travel on the ground, having a portion projecting forwardly, and a flexible member secured to the upper end of said last portion and extended around a guide on the rear portion of said first member and adapted to be pulled for lifting the rear portion of the harrow section.

2. In a device of the class described, the combination of a harrow section with a lifting and clearing device, comprising a member fixed to the rear portion of said section, a member pivoted to said first member and adapted to slide on the ground rearwardly of its pivot point and having an upward extension, a guide element on said first member near the rear portion thereof, and a flexible device connected with said upper extension and extended to and around said guide device.

3. In a device of the class described, a member adapted to be rigidly attached at its forward part to a harrow section and to project rearwardly therefrom, a member pivoted to said first member near the forward portion thereof inclined downwardly and rearwardly and having a shoe portion, an upward extension at the forward part of said last member, and a flexible element secured to said upward extension and guided past the rear portion of said first member.

4. In a harrow lifting and clearing device of the class described, a pair of bars adapted to be secured rigidly at their forward ends to a harrow section, a member having substantially the shape of a bell crank lever pivoted between its ends between said bars near the forward ends thereof, one arm of said last-named member being inclined downwardly and rearwardly from said first-named bars and having a portion forming a shoe, and the other arm extending upwardly, a flexible element secured to the upper portion of said laterally extending arm and guided past the rear ends of said first described bars.

Des Moines, Iowa, May 20, 1921.

PETER H. THIEL.